Dec. 20, 1955   J. L. ADRIAN ET AL   2,727,580
PITCH CHANGING MECHANISM
Filed Dec. 27, 1952                    2 Sheets-Sheet 1

INVENTOR
JOSEPH L. ADRIAN and
RICHARD A. SULLIVAN
BY
Godfrey B. Speir
ATTORNEY

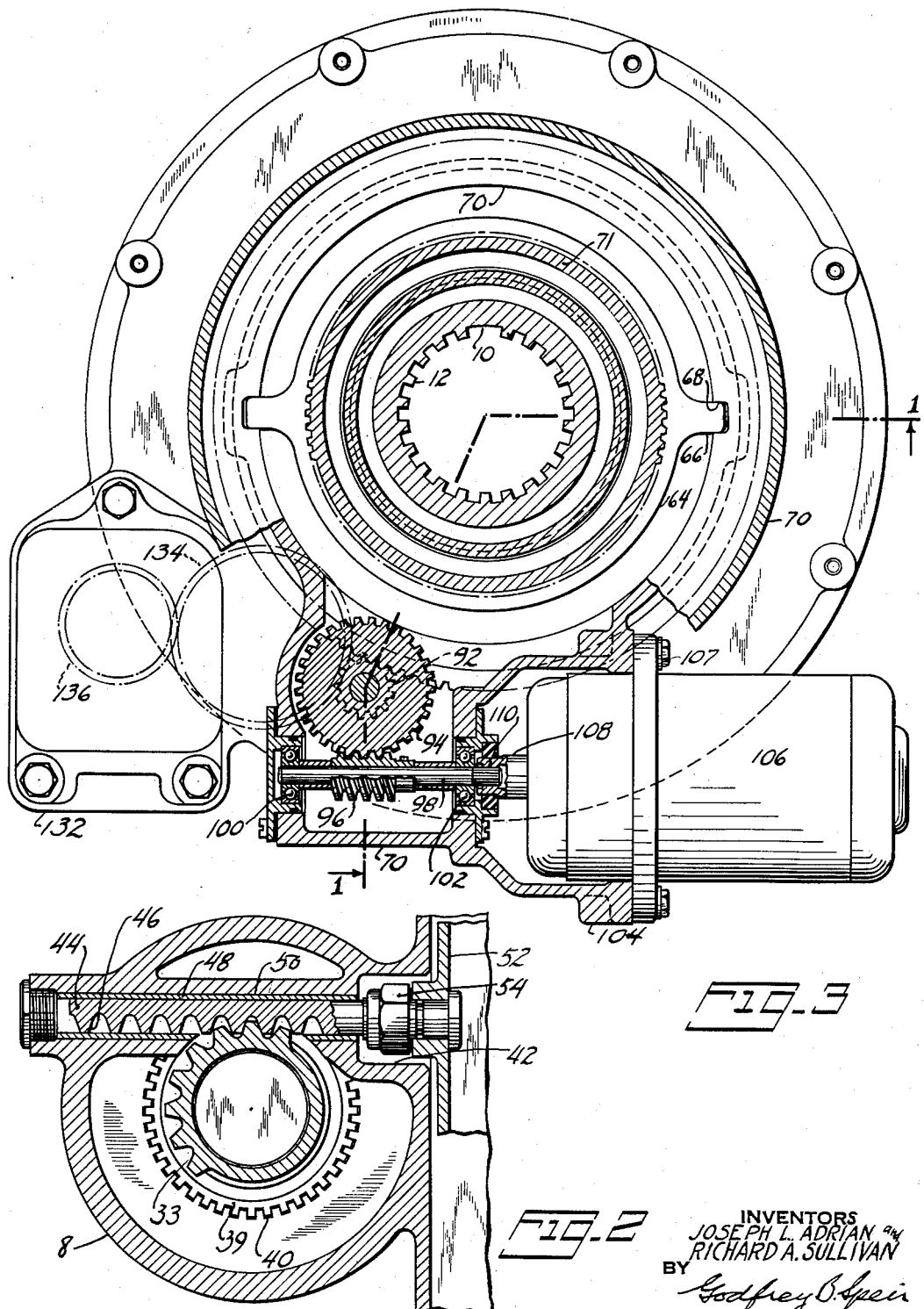

United States Patent Office 2,727,580
Patented Dec. 20, 1955

2,727,580

PITCH CHANGING MECHANISM

Joseph L. Adrian, River Edge, and Richard A. Sullivan, Clifton, N. J., assignors to Curtiss-Wright Corporation, a corporation Application December 27, 1952, Serial No. 328,223

1 Claim. (Cl. 170—160.37)

This invention relates to aeronautical propellers and is concerned with a propeller having an improved form of pitch changing mechanism and hub construction particularly adaptable for use with engines of the order of 300 to 600 horsepower.

Those familiar with the art are fully aware that many varieties of pitch changing mechanisms have been proposed for aeronautical propellers; many of these incorporate mechanisms which require special features within the aircraft power plant to enable propeller operation. In the propeller of this invention, the mechanism is wholly self contained in the propeller assembly so that no auxiliary apparatus except an electrical power supply and a speed governor driven by the engine are needed to provide all functions of which the propeller is capable. Many propellers of the prior art have attained a high degree of complication and it is an object of the present invention to provide a propeller whose components are relatively simple and direct to minimize cost of fabrication of the propeller and to utilize, so far as possible, relatively standard commercially available parts whereby the cost of the propeller may be minimized.

Objects of the invention are to provide an aeronautical propeller having variable pitch blades, having a mechanical pitch changing mechanism driven by an electric motor or any other appropriate type of externally mounted motor, and to provide a range of operation of the propeller which will include normal governed operation for speed control, feathering, and reverse pitch for in-flight or ground braking of the aircraft upon which the propeller is installed.

The propeller in general comprises a hub having blades mounted therein for pitch change. Spur pinions on the blade butts are engaged by racks which extend in an inboard direction to a ring secured to a thrust bearing. One race of the thrust bearing holds the ring and the other race is secured to a nut which is translatable along a screw shaft embracing a rearward extension of the propeller hub. Gear means driven by an electric or other appropriate motor is arranged to drive the screw shaft rotationally by which pitch changing movements are imparted to the propeller blade. The aforesaid gear is also connected to a limit switch assembly which may be arranged to provide normal high and normal low pitch limits, feathering, and reverse pitch.

A more detailed understanding of the invention may be gained by reading the following detailed description in connection with the drawings wherein similar reference characters designate similar parts and wherein:

Fig. 2 is a section on the line 2—2 of Fig. 1; and

Fig. 3 is the section on the line 3—3 of Fig. 1.

Figure 1:
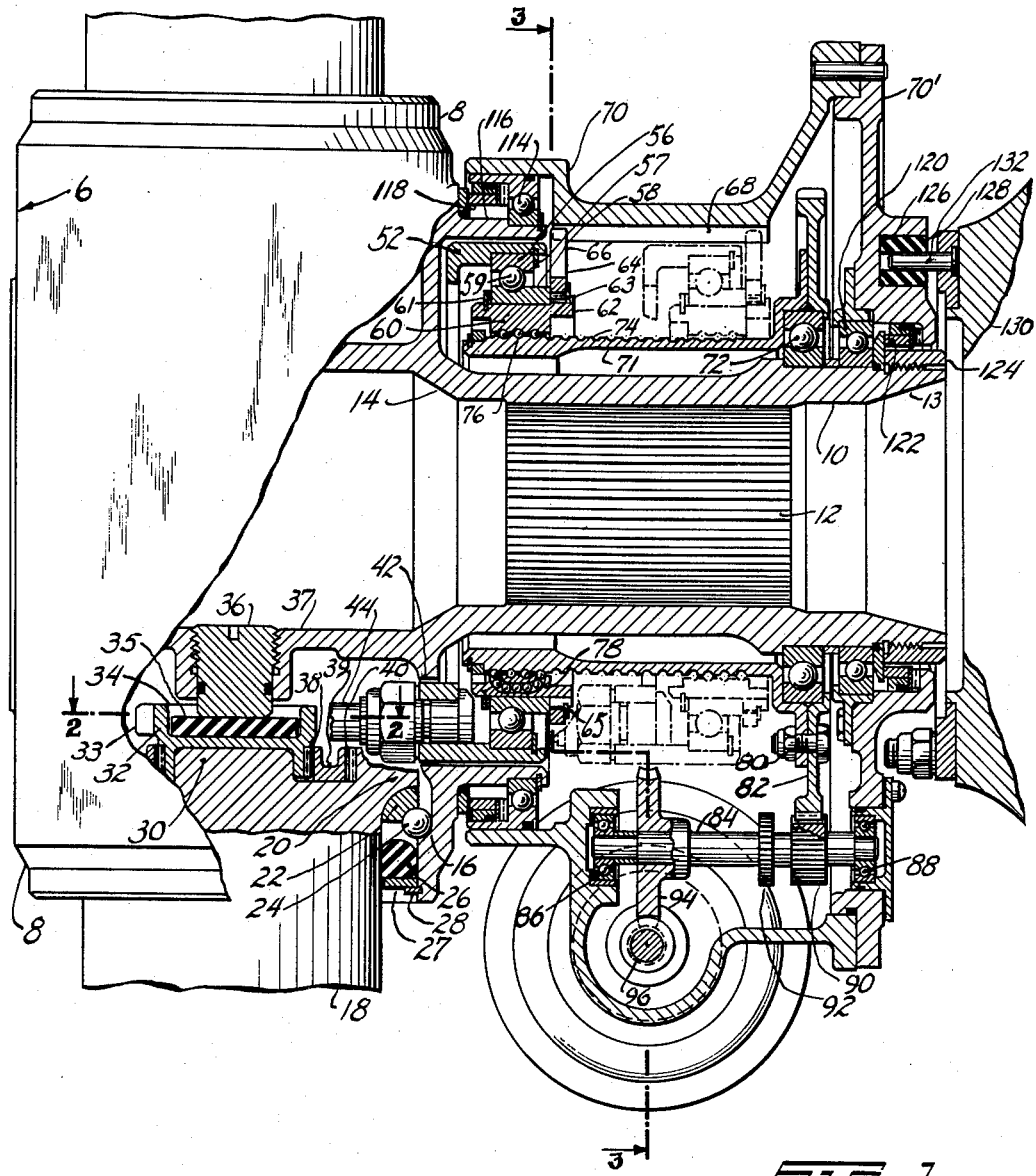
Fig. 1 is a longitudinal section through a portion of the propeller and through the pitch changing mechanism.

The propeller comprises a hub 6 which includes as shown, two blade sockets 8 and a rearward cylindrical hub extension 10 which is mounted in the usual manner upon the shaft of an engine or other prime mover. Splines 12 within the extension 10 engage corresponding splines on the shaft for transmission of power, and conical seats 13 and 14 within the extension 10 are engaged by the usual centering cones provided on the engine shaft.

Each hub socket 8 includes an integral inwardly facing ball race 16. Each propeller blade 18 is provided with an integral flange 20 and an outwardly facing ball race 22 which may pass into the outer end of the socket after which a row of bearing balls 24 is inserted between the races 16 and 22 to provide a retention to hold the blades against outward movement under the influence of centrifugal force, and to enable free rotation of the propeller blades about their own axes for change in blade pitch. An O-ring 26 is installed between the hub socket 8 and the shank of the blade 18 as shown, to seal the blade retention against lubricant leakage. This ring is held in place by a washer 27 and a spring lock ring 28 engaged in a suitable groove formed in the bore of the socket 8.

The butt end of the blade, within the socket, is provided with a button 30 upon which is piloted a member 32 of steel or other wear resistant material. This member 32 is formed as a spur gear segment at 33 and includes a recess 34 containing a thrust pad 35 of phenolic composition or the like. The pad 35 is engaged by a jack screw 36 screwed into a portion 37 of the propeller hub 6. When the blade is installed in the hub the screw 36 is unscrewed to allow considerable clearance between the outer end and the pad 35, to enable assembly of the bearing balls 24. After installation of the balls 24, the screw 36 is screwed outwardly to engage the pad 35, to preload the bearing balls 24 and to hold the propeller blade in its operative position. The jack screw 36 may then be locked by any appropriate device.

The member 32, on the portion thereof embracing the button 30, carries external splines 38 which engage with internal splines on a ring 39. External splines 40 on the ring 39 engage internal splines formed on an inwardly facing annulus of the blade butt 20. The number of spline teeth on the splines 38 and 40 differ by a small number such as one so that the member 39 provides a means of indexing the spur gear 33 relative to the propeller blade whereby the spur gear may be positioned precisely with respect to a reference section of the propeller blade.

A rear wall of the hub 8 is provided with an opening 42 through which a rack bar 44 extends, the part of the bar 44 within the propeller hub having teeth 46 which are engaged with the teeth of the gear 33. The rack bar 44, as shown in Fig. 2, is slidable in a bushing 48 secured within a bore 50 forming part of the propeller hub. Axial movement of the bar 44 will rotate the gear 33 and the propeller blade about the blade axis.

Immediately rearward of the hub 6, and embracing the hub extension 10, is a ring 52 to which the rack bar 44 is secured by a thread and nut connection shown at 54. There is one rack bar 44 for each blade of the propeller and all of the rack bars of the propeller are secured to the ring 52 in the same manner. By this construction, axial movement of the ring 52 imparts the same amount of pitch changing rotation to all blades of the propeller.

Within the ring 52, the outer race 56 of a thrust ball bearing is secured by a lock ring 57. The race 56 cooperates with an inner race 58 through bearing balls 59, and the inner race 58 embraces and is secured at one end by annular nut 60 by a lock ring 61. The other end of the nut 69 is provided with an integral flange 62 against which the race 58 bears. In addition, the flange 62 is externally splined at 63 to receive a ring 64 which is internally splined to match the splines 63.

The ring 64 is held on the splines 63 by a lock ring 65. The ring 64 is provided with at least one and preferably two radially extending dogs 66 which engage in grooves 68 formed on the inside of a non-rotating housing 70 which embraces the entire pitch changing mechanism. The grooves 68 and the dogs 66 constrain the nut 60 against rotation. The ring 52 rotates with the propeller. The bearing 56, 58 or 59 allows the relative rotation but holds the nut 60 and the ring 52 in the same axial position.

Embracing the hub extension 10 is a hollow screw shaft 71 which is carried on the hub extension 10 by a radial and thrust bearing 72. This shaft is provided with an external helical ball groove 74 which cooperates with an internal helical ball groove formed within the nut 60, through a row of circulating bearing balls 76. The nut 60 is provided with a circulating channel 78 and appropriate stops at the ends of the groove formed therein adjacent the channel ends so that the balls 76, as the sleeve 70 rotates with respect to the nut 60, may roll between the helical grooves and transfer from one end of the nut to the other through the channel 78. This type of ball screw construction is known in the art and provides as an assembly, a low friction screw shift whereby rotation of one element of the assembly moves the other element in an axial direction with a minimum of torsional effort.

The inboard end of the screw shaft 71 is flanged adjacent the bearing 72 and is secured as at 80 to a spur gear 82 concentric with the shaft 71 and the bearing 72. The gear 82 and the screw shaft 71 together embrace the outer race of the bearing 72 whereby the bearing provides support for both elements. The inner race of the bearing 72 is seated upon an external portion of the hub extension 10.

The housing 70 carries a layshaft 84 in bearings 86 and 88, the layshaft including a pinion 90 engaging the gear 82. The layshaft also carries a pinion 92 whose purpose will be described, and a worm wheel 94 engaged by a worm 96 mounted upon a shaft 98. The shaft 98, as shown in Fig. 3, is mounted in bearings 100 and 102 in the housing 70 and lies in a plane normal to the rotation axis of the propeller. The housing 70 is also provided with an integral receptacle 104 within which a bi-directional electric motor 106 or other suitable small reversible prime mover may be secured as by bolts 107. The driving shaft 108 of the motor 106 is spline-connected to the shaft 98 at 110.

From the above, it will be clear that rotation of the shaft 108 of the motor 106 rotates the worm 96, the worm wheel 94, the pinion 90, the gear 82, and the screw shaft 70. Screw shaft rotation translates the nut 60 along the screw shaft and draws the rack bars 44 back and forth in the propeller hub to rotate the propeller blades for pitch change. Direction of motor rotation will cause increase or decrease of propeller blade pitch. The housing 70 at its outboard end embraces a bearing 114 which is piloted on an annular flange 116 formed on the propeller hub 6. A suitable ring seal 118 between the housing and propeller hub prevents leakage of lubricant contained within the housing 70.

The rearward end of the housing 70 engages a back plate 70', the back plate being piloted on the hub extension 10 through a bearing 120 and being sealed relative to the hub extension by a ring seal 122. A nut 124 screwed on the inboard end of the extension 10 serves to secure the housing assembly on the propeller and to lock the bearing 120 in its proper location. To prevent rotation of the housing assembly, the back plate 70' is provided with a recess 126 which engages over a dowel 128 secured to the engine nose 130. If desired, a resilient sleeve 132 may be inserted between the dowel 126 and the back plate 70' to assume shock loading and misalinement resulting from operating stresses.

The housing 70 has secured thereto a limit switch box 132 shown in Fig. 3 which contains a plurality of cam-operated switches, in a manner well known in the art, to provide pitch limit stops for the high and low normal range, feathering, and reverse pitch, these switches cooperating with the propeller controls and the circuit for operating the motor 106. The cam of the switch assembly 132 is driven from the gear 92 through an idler gear 134 and a cam gear 136. The motor 106, in a manner well known in the art, is provided with an electro-magnetic brake so that when the motor is not in operation, the shaft 108 thereof is locked against rotation to prevent pitch change of the propeller.

The normal high operating speed of the motor 106 is reduced through the gear train above described and through the screw shaft connection to provide an appropriate rate of pitch change for the propeller blades of the order of 3 to 25 degrees per second according to the propeller function which may be desired. The rate is established in the usual way, by controlling the average flow of energy to the motor.

The above described propeller with its blade retention and pitch changing system enables the production of a relatively simple and low weight assembly which meets the objective set forth at the beginning of this specification.

Though one embodiment of the invention is shown, it is to be understood that the invention may be applied in various forms and in various environments. Changes may be made in the arrangements shown without departing from the spirit of the invention. Reference should be had to the appended claim for definition of the limits of the invention.

What is claimed is:

A variable pitch propeller comprising a hub including substantially radial blade sockets integral with an inboard substantially cylindrical hub extension, blades rotatable on said hub for pitch change, the propeller being adaptable for mounting as a unit upon a driving shaft, a housing embracing said hub extension journalled at its inboard end on said extension and at its outboard end on said hub and substantially coextensive in length with said extension, said housing including means cooperative with a fixed support to hold the housing from rotation with the propeller, a normally non-rotating gear coaxial with and journalled on said extension toward the inboard end thereof, means carried by said housing to rotate said gear selectively in either direction, a screw sleeve concentric with and secured to said gear for rotation therewith, said sleeve extending from said gear in an outboard direction within said housing, a nut threadedly engaging said screw sleeve and translatable therealong upon sleeve rotation, means to hold said nut from rotation, connected to said housing, a two-way thrust bearing embracing said nut having an inner race secured to the nut and having an outer race, means secured to said outer race rotatable with the propeller hub and contained predominantly within said housing, and an axial pitch changing driving connection from said outer race means to the butts of said propeller blades.

References Cited in the file of this patent

UNITED STATES PATENTS

| 1,942,100 | Houston | Jan. 2, 1934 |
| 2,370,135 | Berliner | Feb. 27, 1945 |
| 2,397,524 | Bellomo | Apr. 2, 1946 |
| 2,405,488 | Briner | Aug. 6, 1946 |
| 2,437,188 | Forsyth | Mar. 2, 1948 |
| 2,450,420 | Cline | Oct. 5, 1948 |